Feb. 9, 1932.  C. E. PAXTON  1,844,438

PARKING MIRROR FOR MOTOR VEHICLES

Filed Aug. 28, 1929

C. E. Paxton,
INVENTOR.

BY Lacey & Lacey
ATTORNEYS

Patented Feb. 9, 1932

1,844,438

UNITED STATES PATENT OFFICE

CLYDE E. PAXTON, OF ST. JOSEPH, MISSOURI, ASSIGNOR OF ONE-FIFTH TO NEWTON J. RICE, OF ST. JOSEPH, MISSOURI

PARKING MIRROR FOR MOTOR VEHICLES

Application filed August 28, 1929. Serial No. 389,028.

The present invention is directed to improvements in parking mirrors for motor vehicles.

The primary object of the invention is to provide a device of this character so constructed that it can be placed within the body of a closed car and in a position so that the driver may readily see the curb when parking or the adjacent portion of an automobile already parked so that he can conveniently park his car without the necessity of turning his head.

Another object of the invention is to provide a device of this character which can be easily and quickly applied to the vehicle and in line with the usual rear view mirror so that the condition present rearwardly of an automobile being parked can be readily discerned.

Another object of the invention is to provide a device of this character which is exceedingly simple in construction, durable, efficient in operation, and one which can be conveniently adjusted to suit varying conditions.

With these and other objects in view, this invention resides in the novel features of construction, formation, combination and arrangement of parts to be hereinafter more fully described, claimed and illustrated in the accompanying drawings, in which:

Figure 1:
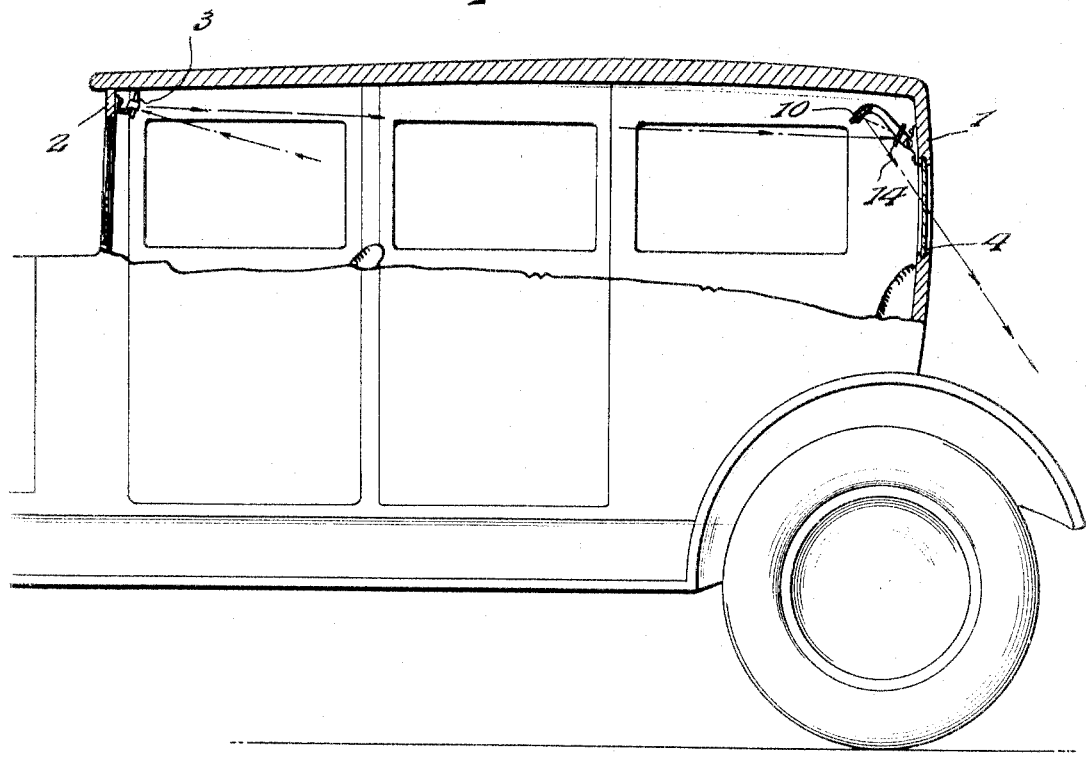
Figure 1 is a side elevation of a part of an automobile of the closed type, with parts broken away to illustrate the position of the device therein.
Figure 2:
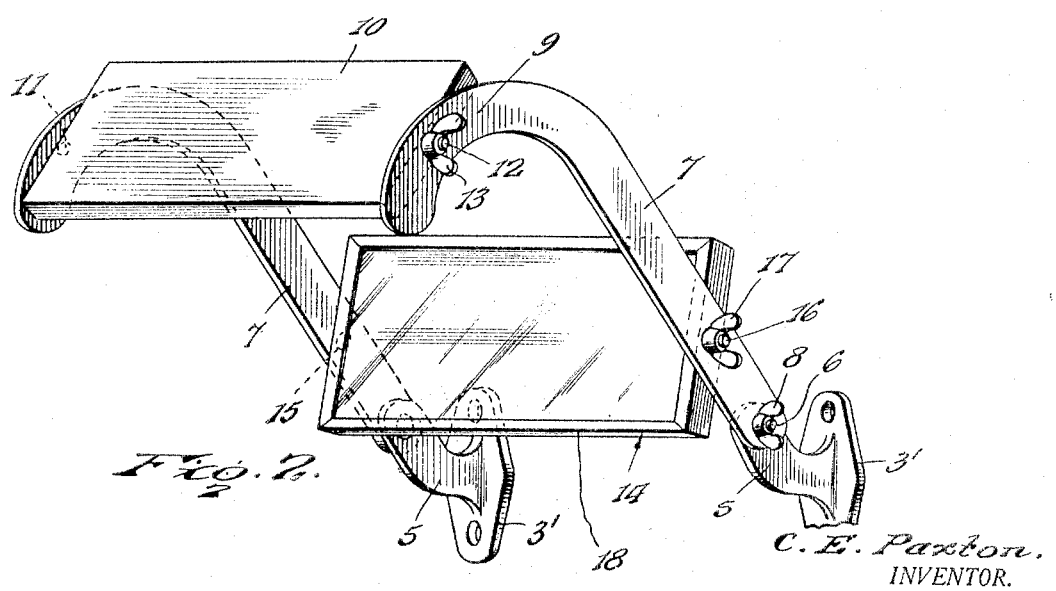
Figure 2 is a perspective view of the device removed from the automobile.

Referring to the drawings, 1 designates the body of an automobile of the closed type and to the front frame bar 2 is secured the usual rear view mirror 3 which cooperates with the improved mirror in a manner to be hereinafter described.

The improved mirror comprises a pair of plates 3' adapted to be secured in any approved manner to the rear wall of the automobile body and above the rear window 4 thereof. These plates carry upturned arms 5 and to which are pivotally connected by bolts 6, arms 7, said bolts having wing nuts 8 applied thereto so that the arms 7 may be held in various positions of adjustment.

The upper ends of the arms 7 terminate in curved sections 9 and between which is arranged the mirror 10, said mirror being pivotally connected to the curved sections 9 by a trunnion 11 and threaded shank 12, the latter having a wing nut 13 carried thereby so that the mirror can be held in various positions of adjustment.

A second mirror 14 is employed and is also provided with a trunnion 15 for pivotally engaging one of the arms 7, and is further provided with a threaded shank 16 for pivotal engagement with the companion arm, there being a wing nut 17 engaged with the shank in order that the mirror 14 can be held in adjusted position. The mirrors are preferably enclosed in frames or casing 18 of any suitable material and design.

It will be observed that the mirror 10 is located somewhat above the mirror 14 and has its active face presented to the active face of the mirror 14, whereas the active face of the mirror 14 is in a line with the rear view mirror 3. By positioning the mirror 10 in an inclined position, as shown in the drawings, the same will be so located that the line of vision from the rear view mirror 3 is reflected from the mirror 14 into the mirror 10, which in turn is reflected through the window opening 4 so that the driver can readily ascertain the condition present rearwardly of the car in order that he can park conveniently and without the danger of encountering the curb or an adjacent automobile.

Since the mirrors 10 and 14 are readily adjustable, they can be arranged to suit persons of various heights and will prove most effective for aiding a person in parking an automobile.

From the foregoing it is thought that the operation and many advantages of the herein described invention will be apparent to those skilled in the art, without further description, and it will be understood that various changes in size, shape, proportion and minor details of construction may be resorted to without departing from the spirit or sacrificing any of the advantages of the invention.

What is claimed is:

A rear view observer for a vehicle comprising brackets adapted to be secured to the rear wall of a vehicle body above opposite sides of a window opening, arms pivoted at their rear ends to said brackets for vertical swinging movement and projecting forwardly from the brackets, said arms having free front end portions curved downwardly, a mirror pivotally mounted between the front ends of said arms, and a second mirror pivotally mounted between said arms adjacent their rear ends for cooperation with the first named mirror.

In testimony whereof I affix my signature.

CLYDE E. PAXTON. [L. S.]